United States Patent
Schwab et al.

(10) Patent No.: US 8,076,443 B2
(45) Date of Patent: Dec. 13, 2011

(54) PREPARATION OF POLYHEDRAL OLIGOMERIC SILSESQUIOXANE SILANOLS AND SILOXIDES FUNCTIONALIZED WITH OLEFINIC GROUPS

(75) Inventors: Joseph J. Schwab, Huntington Beach, CA (US); Yi-Zhong An, Irvine, CA (US); Sukhendu B. Hait, Hattlesburg, MS (US); William A. Reinerth, Sr., Riverside, RI (US); Hendrikus C. L. Abbenhuis, Eindhoven (NL)

(73) Assignee: Hybrid Plastics, Inc., Hattieburg, MS (US)

( * ) Notice: Subject to any disclaimer, the term of this patent is extended or adjusted under 35 U.S.C. 154(b) by 878 days.

(21) Appl. No.: 11/464,925

(22) Filed: Aug. 16, 2006

(65) Prior Publication Data

US 2008/0051546 A1 Feb. 28, 2008

Related U.S. Application Data

(63) Continuation-in-part of application No. 11/420,449, filed on May 25, 2006, now Pat. No. 7,888,435, which is a continuation-in-part of application No. 11/371,195, filed on Mar. 7, 2006, now Pat. No. 7,485,692, and a continuation-in-part of application No. 11/342,240, filed on Jan. 27, 2006, now Pat. No. 7,638,195, which is a continuation-in-part of application No. 11/225,607, filed on Sep. 12, 2005, now Pat. No. 7,553,904, which is a continuation-in-part of application No. 11/166,008, filed on Jun. 24, 2005, now abandoned, and a continuation-in-part of application No. 10/351,292, filed on Jan. 23, 2003, now Pat. No. 6,933,345, which is a continuation-in-part of application No. 09/818,265, filed on Mar. 26, 2001, now Pat. No. 6,716,919, which is a continuation-in-part of application No. 09/631,892, filed on Aug. 4, 2000, now Pat. No. 6,972,312, said application No. 11/166,008 is a continuation of application No. 10/186,318, filed on Jun. 27, 2002, now Pat. No. 6,927,270, which is a continuation-in-part of application No. 09/747,762, filed on Dec. 21, 2000, now Pat. No. 6,911,518.

(60) Provisional application No. 60/708,966, filed on Aug. 16, 2005, provisional application No. 60/684,666, filed on May 25, 2005, provisional application No. 60/659,722, filed on Mar. 7, 2005, provisional application No. 60/648,327, filed on Jan. 27, 2005, provisional application No. 60/608,582, filed on Sep. 10, 2004, provisional application No. 60/147,435, filed on Aug. 4, 1999, provisional application No. 60/351,523, filed on Jan. 23, 2002, provisional application No. 60/192,083, filed on Mar. 24, 2000, provisional application No. 60/171,888, filed on Dec. 23, 1999, provisional application No. 60/301,544, filed on Jun. 27, 2001.

(51) Int. Cl.
$C08G\ 77/20$ (2006.01)
(52) U.S. Cl. .............................. 528/32; 528/12
(58) Field of Classification Search .................... 528/12, 528/32

See application file for complete search history.

(56) References Cited

U.S. PATENT DOCUMENTS

| | | |
|---|---|---|
| 5,047,492 A | 9/1991 | Weidner et al. |
| 5,412,053 A | 5/1995 | Lichtenhan et al. |
| 5,484,867 A | 1/1996 | Lichtenhan et al. |
| 5,589,562 A | 12/1996 | Lichtenhan et al. |
| 5,750,741 A | 5/1998 | Crocker et al. |
| 5,939,576 A | 8/1999 | Lichtenhan et al. |
| 5,942,638 A | 8/1999 | Lichtenhan et al. |
| 6,100,417 A | 8/2000 | Lichtenhan et al. |
| 6,660,823 B1 | 12/2003 | Lichtenhan et al. |
| 6,767,930 B1 | 7/2004 | Svejda et al. |
| 6,972,312 B1 | 12/2005 | Lichtenhan et al. |
| 2003/0055193 A1 | 3/2003 | Lichtenhan et al. |
| 2004/0030084 A1 | 2/2004 | Morimoto |
| 2004/0068074 A1 | 4/2004 | Yoshida et al. |

FOREIGN PATENT DOCUMENTS

| | | |
|---|---|---|
| CN | 1504494 | 6/2004 |
| DE | 103 04 735 | * 7/2004 |
| EP | 0967299 | 12/1999 |
| EP | 1213053 | 6/2002 |
| WO | WO 01/10871 | 2/2001 |
| WO | WO 02/100867 | 12/2002 |
| WO | WO 03/024870 | 3/2003 |
| WO | WO 03/042223 | 5/2003 |
| WO | WO 03/082465 | 10/2003 |
| WO | WO 2004/014924 | 2/2004 |
| WO | WO 2004/026883 | 4/2004 |

* cited by examiner

*Primary Examiner* — Kuo-Liang Peng
(74) *Attorney, Agent, or Firm* — David H. Jaffer; Pillsbury Winthrop Shaw Pittman LLP

(57) ABSTRACT

A synthetic process for polyhedral oligomeric silsesquioxanes (POSS) and polyhedral oligomeric silicates (POS) produces silanol and siloxide molecules containing both olefinic groups and alkyl or aromatic groups. Olefin-bearing POSS silanol/siloxides are derivatized into a variety of chemical species while retaining the ability to further derivatize the silanol/siloxide.

10 Claims, 2 Drawing Sheets

US 8,076,443 B2

PREPARATION OF POLYHEDRAL OLIGOMERIC SILSESQUIOXANE SILANOLS AND SILOXIDES FUNCTIONALIZED WITH OLEFINIC GROUPS

RELATED APPLICATIONS

This application claims priority from U.S. Provisional Patent Application Ser. No. 60/708,966 filed Aug. 16, 2005, and is a continuation-in-part of U.S. patent application Ser. No. 11/420,449 filed May 25, 2006 now U.S. Pat. No. 7,888,435 (which claims priority from U.S. Provisional Patent Application Ser. No. 60/684,666 filed May 25, 2005), which is a continuation-in-part of U.S. patent application Ser. No. 11/371,195 filed Mar. 7, 2006 now U.S. Pat. No. 7,485,692 (which claims the benefit of U.S. Provisional Patent Application Ser. No. 60/659,722 filed Mar. 7, 2005) and a continuation-in-part of U.S. patent application Ser. No. 11/342,240 filed Jan. 27, 2006 now U.S. Pat. No. 7,638,195 (which claims the benefit of U.S. Provisional Patent Application Ser. No. 60/648,327 filed Jan. 27, 2005), which is a continuation-in-part of U.S. patent application Ser. No. 11/225,607 filed Sep. 12, 2005 now U.S. Pat. No. 7,553,904 (which claims priority from U.S. Provisional Patent Application Ser. No. 60/608,582 filed Sep. 10, 2004), which is a continuation-in-part of U.S. patent application Ser. No. 11/166,008 filed Jun. 24, 2005, now abandoned which is (a) a continuation of U.S. patent application Ser. No. 09/631,892 filed Aug. 4, 2000, now U.S. Pat. No. 6,972,312 (which claims priority from U.S. Provisional Patent Application Ser. No. 60/147,435, filed Aug. 4, 1999); (b) a continuation of U.S. patent application Ser. No. 10/351,292, filed Jan. 23, 2003, now U.S. Pat. No. 6,933,345 (which claims priority from U.S. Provisional Patent Application Ser. No. 60/351,523, filed Jan. 23, 2002), which is a continuation-in-part of U.S. patent application Ser. No. 09/818,265, filed Mar. 26, 2001, now U.S. Pat. No. 6,716,919 (which claims priority from U.S. Provisional Patent Application Ser. No. 60/192,083, filed Mar. 24, 2000); (c) a continuation of U.S. patent application Ser. No. 09/747,762, filed Dec. 21, 2000, now U.S. Pat. No. 6,911,518 (which claims priority from U.S. Provisional Patent Application Ser. No. 60/171,888, filed Dec. 23, 1999); and (d) a continuation of U.S. patent application Ser. No. 10/186,318, filed Jun. 27, 2002, now U.S. Pat. No. 6,927,270 (which claims priority from U.S. Provisional Patent Application Ser. No. 60/301,544, filed Jun. 27, 2001). The disclosures of the foregoing applications are incorporated herein by reference.

FIELD OF THE INVENTION

This invention relates to a process for functionalization of polyhedral oligomeric silsesquioxane silanols and siloxides with olefinic groups, enhancing their physical, chemical, and electronic properties, and their suitability for incorporation into catalytic, metallic, polymeric, electronic, medical, cosmetic, and biological products.

BACKGROUND OF THE INVENTION

Nanostructured chemicals are best exemplified by those based on low-cost Polyhedral Oligomeric Silsesquioxanes (POSS) and Polyhedral Oligomeric Silicates (POS). POSS and POS systems contain hybrid (i.e. organic-inorganic) compositions in which the internal cage framework is primarily comprised of rigid inorganic silicon-oxygen bonds. The exterior of the nanostructure is covered by both reactive and nonreactive organic functionalities (R), which ensure compatibility and tailorability of the nanostructure with organic and inorganic materials. These and other properties and features of nanostructured chemicals are discussed in detail in U.S. Pat. Nos. 5,412,053 and 5,484,867, which are incorporated herein by reference.

Current engineering methods produce POSS silanols bearing one through four silanol groups per cage. Control over the stereochemistry and silation of the silanols has been discussed extensively in the U.S. Pat. No. 6,660,823, and a significant number of POSS silanols and POSS siloxide anions have become items of commerce.

Certain microelectronic, medical, catalytic, and biological applications could benefit from POSS silanols containing mixtures of R groups on the cage where one or more types of R group are greatly different in reactivity or properties (e.g. hydrophilic vs hydrophobic) from other R groups on the cage. Under such a scenario it would be desirable to maintain the silanol groups for bonding to metallic, biological, or polymeric surfaces, via covalent silation, hydrogen bonding, ion paring, or Van der Waals contact. Thus a need exists to provide POSS silanols bearing one or more different R groups on the same POSS silanol cage molecule. It is especially desirable to produce POSS cages with reactive olefinic groups $R^2$ which can participate in other chemistry than that available to the $R^1$ groups and the silanols or siloxides (FIG. 1).

A key to the utility of POSS molecules and their compatibility with man-made and organic materials and surfaces is that their dispersion is thermodynamically governed by the Gibbs free energy of mixing equation ($\Delta G = \Delta H - T\Delta S$). The nature of the R group and ability of the reactive groups on the POSS cage to react or interact with polymers and surfaces greatly contributes to a favorable enthalpic ($\Delta H$) term while the entropic term ($\Delta S$) is highly favorable when the cage size is monoscopic.

Consequently a need exists for improvement upon the prior art of POSS cage compositions. An improved process yielding high purity and molecularly precise POSS silanols or POSS siloxides bearing combinations of hydrophobic and hydrophilic and saturated and unsaturated R groups on the same molecule is described.

SUMMARY OF THE INVENTION

The present invention describes synthetic methods of preparing POSS or POS cage compositions bearing combinations of hydrophobic, hydrophilic, saturated, unsaturated, and biologically active R groups on the same molecule.

A synthetic process that renders polyhedral oligomeric silsesquioxane and polyhedral oligomeric silsesquioxane silanols and siloxides rapidly, in high yield, and containing wholly olefinic groups, or mixtures of olefinic and aromatic or alkyl, or biologically compatible groups is provided. The process involves the use of hydroxide bases with silane coupling agents of the formula $R^1SiX_3$ and $R^2SiX_3$ to form POSS cages functionalized with silanols of the formula types $[(R^1SiO_{1.5})_7$, $_x(R^2SiO_{1.5})_x(HOSiO_{1.5})_1]_{\Sigma 8}$, $[(R^1SiO_{1.5})_{6-x}(R^2SiO_{1.5})_x(R^1HOSiO_1)_{2-x}(R^2HOSiO_1)_x]_{\Sigma 8}$, $[(R^1SiO_{1.5})_{2-x}(R^2SiO_{1.5})_x(R^1HOSiO_1)_{4-x}(R^2HOSiO_1)_x]_{\Sigma 6}$, $[(R^1SiO_{1.5})_4(R^2SiO_{1.5})_{4-x}(R^1HOSiO_1)_{3-x}(R^2HOSiO_1)_x]_{\Sigma 7}$ where $R^1$ is an alkyl or aryl group and $R^2$ is an olefin. The olefin groups can be subsequently derivatized though oxidative addition reactions, reductive addition reactions, metathesis, or polymerization as a means to afford additional properties such as polarity, hydrophobicity, lubrication, and biological compatibility or to immobilize to the POSS cage while rendering the silanols or siloxides for surface modification, reactive silation, or association with metals or other materials.

DEFINITION OF FORMULA REPRESENTATIONS FOR NANOSTRUCTURES

Figure 1:
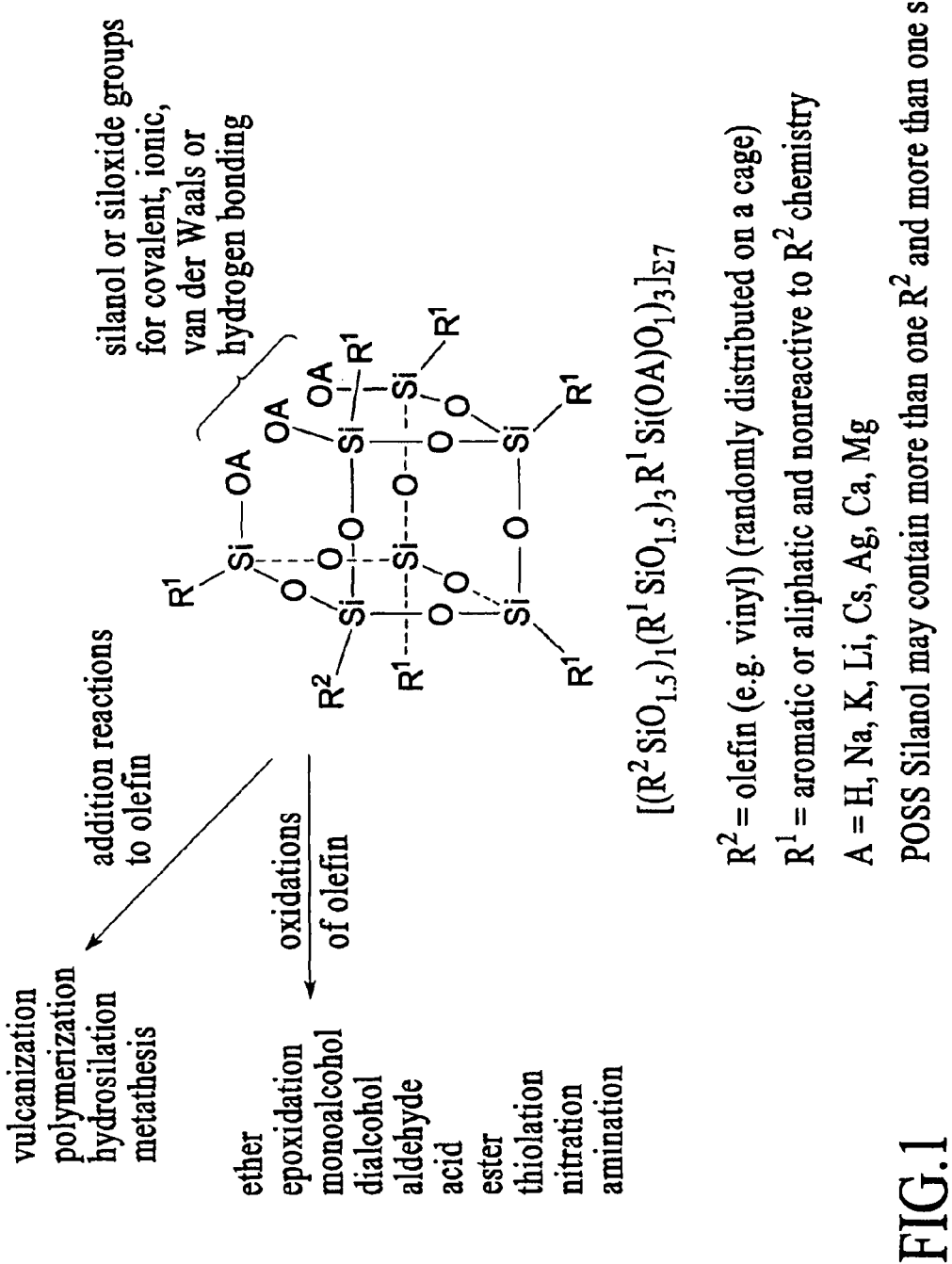
FIG. 1 shows a representative formula of a POSS cage bearing silanol/siloxide groups and two types of organic groups where the $R^1$ and $R^2$ groups are randomly incorporated into the cage.

For the purposes of understanding this invention's chemical compositions, the following definition for formula representations of Polyhedral Oligomeric Silsesquioxane (POSS) and Polyhedral Oligomeric Silicate (POS) nanostructures is made.

Polysilsesquioxanes are materials represented by the formula $[RSiO_{1.5}]_\infty$ where $\infty$ represents molar degree of polymerization and R=represents an organic substituent (H, siloxy, cyclic or linear aliphatic or aromatic groups that may additionally contain reactive functionalities such as alcohols, esters, amines, ketones, olefins, ethers or halides or which may contain fluorinated groups, silicones, or aliphatic and aromatic groups). Polysilsesquioxanes may be either homoleptic or heteroleptic. The designation R includes $R^1$ and $R^2$ functionalities. Homoleptic systems contain only one type of R group while heteroleptic systems contain more than one type of R group.

POSS and POS nanostructure compositions are represented by the formula:

$[(RSiO_{1.5})_n]_{\Sigma\#}$ for homoleptic compositions $[(RSiO_{1.5})_n(R'SiO_{1.5})_m]_{\Sigma\#}$ for heteroleptic compositions (where R≠R')

$[(RSiO_{1.5})_n(RXSiO_{1.0})_m]_{\Sigma\#}$ for functionalized heteroleptic compositions (where R groups can be equivalent or inequivalent)

In all of the above R is the same as defined above and X includes but is not limited to OH, ONa, OLi, OK, OCs, Cl, Br, I, alkoxide (OR), formate (OCH), acetate (OCOR), acid (OCOH), ester (OCOR), peroxide (OOR), amine $(NR_2)$, isocyanate (NCO), and R. The symbols m and n refer to the stoichiometry of the composition. The symbol Σ indicates that the composition forms a nanostructure and the symbol # refers to the number of silicon atoms contained within the nanostructure. The value for # is usually the sum of m+n, where n ranges typically from 1 to 24 and m ranges typically from 1 to 12. It should be noted that Y# is not to be confused as a multiplier for determining stoichiometry, as it merely describes the overall nanostructural characteristics of the system (aka cage size).

DETAILED DESCRIPTION OF THE INVENTION

The present invention teaches a method for polyhedral oligomeric silsesquioxane (POSS) or polyhedral oligomeric silicate (POS) synthesis that renders mixtures of dissimilar R groups on the cage.

A key feature of the invention is the use of synergistically tolerant stoichiometric ratios of $R^1SiX_3$ and $R^2SiX_3$ silane coupling agents which allow for statistical incorporation of two types of organic groups ($R^1$ and $R^2$) into the same cage while preserving the POSS silanol/siloxide groups. Additionally, the ability to prepare cages with R-groups bearing unsaturated functionality allows for the further functionalization of the POSS cage.

Preparative methods for POSS silanols have been described in U.S. Pat. No. 6,972,312 and in U.S. patent application Ser. No. 11/371,195, which are incorporated by reference. As described previously, the cage assembly synthesis process involves the use of hydroxide bases in reaction with silane coupling agents of the formula $R^1SiX_3$ and $R^2SiX_3$ to form POSS cages functionalized with silanols or siloxide groups.

POSS silanols are preferred compositions as these offer the most versatility in application and derivatization chemistry. Preferred POSS silanol formula types include $[(R^1SiO_{1.5})_{7-x}(R^2SiO_{1.5})_x(HOSiO_{1.5})_1]_{\Sigma 8}$, $[(R^1SiO_{1.5})_{6-x}(R^2SiO_{1.5})_x(R^1HOSiO_{1})_{2-x}(R^2HOSiO_1)_x]_{\Sigma 8}$, $[(R^1SiO_{1.5})_{2-x}(R^2SiO_{1.5})_x(R^1HOSiO_1)_{4-x}(R^2HOSiO_1)_x]_{\Sigma 6}$, and $[(R^1SiO_{1.5})_4(R^2SiO_{1.5})_{4-x}(R^1HOSiO_1)_{3-x}(R^2HOSiO_1)_x]_{\Sigma 7}$ where $R^1$ is an alkyl or aryl group and $R^2$ is an olefin. For the generation of POSS silanol/siloxides bearing a mixture of olefinic $R^2$ and aliphatic $R^1$ groups, a valuable tool in the utility of this process is to maintain an approximately 15:85 to 25:75, and preferably a 20:80 molar ratio of the two $R^1SiX_3$ and $R^2SiX_3$ silane coupling agents. This is particularly effective when incorporating vinyl and isobutyl groups into the same POSS cage. POSS silanol/siloxide cages in which all R groups are olefinic can also be prepared in a similar manner through variation of the ratio to the extreme of 100:0. The process is valid for all conceivable compositional ranges of $R^1SiX_3$ and $R^2SiX_3$.

Olefinic groups on POSS cages can be subsequently derivatized though any number of oxidation or addition reactions. These include metathesis (U.S. Pat. No. 5,942,638) or oxidation reactions (U.S. Pat. Nos. 6,100,417 and 6,767,930), addition reactions (U.S. Pat. Nos. 5,939,576 and 5,047,492), or polymerizations. This advancement in the art of POSS provides the ability to carry out chemical derivatization of the R groups while maintaining nonreactive R groups on the cage and reactive silanol/siloxide groups.

General Process Variables Applicable to All Processes

As is typical with chemical processes there are a number of variables that can be used to control the purity, selectivity, rate and mechanism of any process. Variables influencing the process include the size, polydispersity, and composition of the nanostructured chemicals, separation and isolation methods, and use of catalyst or cocatalysts, solvents and cosolvents. Additionally, kinetic and thermodynamic means of controlling the synthesis mechanism, rate, and product distribution are also known tools of the trade that can impact product quality and economics.

The following examples are provided to demonstrate practice of the invention and in no way indicate limitation of the scope or range of the invention.

POSS Olefinic Silanol/Siloxide Synthesis

EXAMPLE 1

Preparation of Mixed $R^1$ and $R^2$ POSS Trisilanols

Figure 2:
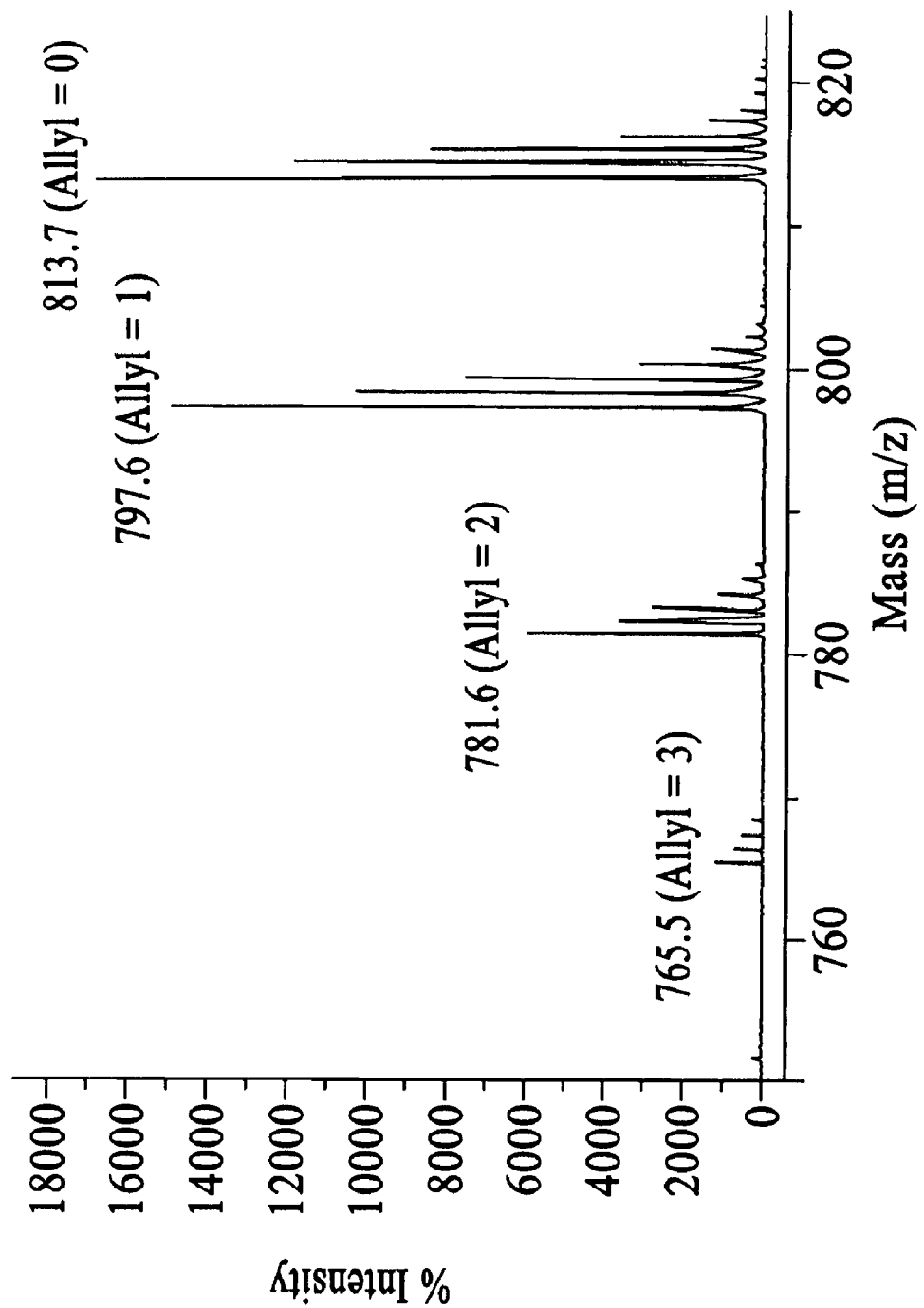
FIG. 2 shows a mass spectrum of products from Example 1.

In order to demonstrate the stoichiometric range for incorporation of $R^1$ and $R^2$ into a POSS cage the following series of formulations were preformed. A mixture of $(R^1SiX_3)$ $^iBuSi(OMe)_3$ and $(R^2SiX_3)$ allylSi(OMe)$_3$ was added slowly to a slurry containing LiOH.H$_2$O (3.3 g, 0.079 mol) in ethanol (75 mL) and water (1.0 mL, 0.055 mol). The reaction was refluxed for 2 days and then quenched by addition of solution of HCl (15 mL 37 wt.-% HCl) in ice slurry water (100 mL)

and mixed thoroughly for 15 min. The desired mixed R group POSS cages were then extracted into an organic layer through the addition of pentane (100 mL), and aqueous NaCl. The organic layer was then washed with a 4 wt.-% HCl solution (3×100 mL), and the volatiles were removed under reduced pressure. The desired products were collected as white solids and verified by MALDI-TOF and $^1$H NMR spectroscopy. MALDI-TOF spectra include M/Z for the parent POSS formula and an associated sodium atom from the ablation matrix. See FIG. 2.

For $R^2$=allyl $(C_3H_5)$=0 groups $[(C_4H_9SiO_{1.5})_4(C_4H_9HOSiO_1)_3]_{\Sigma7}$ M/Z calculated 813 and found 813.

For $R^2$=allyl=1 group=$[(C_4H_9SiO_{1.5})_4(C_3H_5HOSiO_1)_1(C_4H_9HOSiO_1)_2]_{\Sigma7}$ M/Z calculated 797 and found 797. $^1$H NMR (300 MHz, CDCl$_3$, 25° C.) δ 6.69 (br s, 3 H, OH), 5.79 (m, 2 H, —CH=), 4.93 (m, 4 H, =CH$_2$), 1.85 (m, 5 H, —CH—), 1.61 (m, 4 H, —CH$_2$—CH=CH$_2$), 0.95 (m, 30 H, —CH$_3$), 0.59 (m, 10 H, CH$_2$).

For $R^2$=allyl=2 groups=$[(C_4H_9SiO_{1.5})_4(C_3H_5HOSiO_1)_2(C_4H_9HOSiO_1)_1]_{\Sigma7}$ M/Z calculated 781 and found 781.

For $R^2$=allyl=3 groups=$[(C_4H_9SiO_{1.5})_4(C_3H_5HOSiO_1)_3]_{\Sigma7}$ M/Z calculated 766 and found 766.

EXAMPLE 2

Preparation of $[((CH_3)_2CHCH_2)SiO_{1.5})_4((CH_2CH)(OH)SiO_{1.0})_3]_{\Sigma7}$ Following a similar procedure to that given in Example 1, a 0.5 L flask was charged with 75 ml ethanol and 1 ml (0.055 mol) water. To this mixture was added 3.3 g (0.079 mol) of solid lithium hydroxide-monohydrate (LiOH—H$_2$O) was added followed by addition of 15.3 ml of ($R^1$) iBuSi(OMe)$_3$ and 3.1 ml of ($R^2$) ViSi(OMe)$_3$. The reaction was refluxed for 8 hours and subsequently quenched by adding 100 ml of an ice slurry containing 15 ml of concentrated (37%) HCl. The desired product was extracted into an organic layer by adding 100 ml of pentane and stirring for 30 minutes followed by addition of NaCl. The pentane layer was removed and washed three additional times with 100 ml of a 4 wt % HCL solution. The organic volatiles were removed under reduced pressure and the desired product was isolated (9.6 g, 55.8%) as white solid in the compound was analyzed using MALDI-TOF-MS and identified as $[((CH_3)_2CHCH_2)SiO_{1.5})_4((CH_2CH)(OH)SiO_{1.0})_3]_{\Sigma7}$.

EXAMPLE 3

Preparation of $[(c-C_5H_9)SiO_{1.5})_4((CH_2CH)(OH)SiO_1)_1((c-C_5H_9)(OH)SiO_1)_2]_{\Sigma7}$ Following a similar procedure to that given in Example 1, $R^1$ Cyclopentyltrichlorosilane (36.2 g, 0.178 mol) and methanol (112 mL) was added to a 2 L 3 neck flask fitted with mechanical stirrer and reflux condenser. LiOH.H$_2$O (23 g, 0.548 mol) was then added slowly over a period of 1 h. After stirring for another 30 min, acetone (700 mL), $R^2$ vinyltrimethoxysilane (22.2 g, 0.15 mol), water (6.7 g) and LiOH.H$_2$O (7 g, 0.167 mol) was added and heated to reflux with stirring. After 24 h refluxing the mixture was acidified while hot by pouring dropwise a solution of ice/water (1 L) and HCl (24.5 mL, 37%) into the stirred reaction vessel. Hexane (250 mL) was then added and was separated and removed under vacuum. The resulting white powder was washed with methanol and dried under reduced pressure to yield 11;3 g (35%) of the desired product. The product was characterized by multinuclear NMR.

EXAMPLE 4

Preparation of $[((c-C_6H_9)SiO1.5)_4((c-C_6H_9)(OH)SiO_{1.0})_3]_{\Sigma7}$

In a 500-mL flask containing a magnetic stir bar ($R^2$) Cyclohexenyltrimethoxysilane (30.2 g, 150 mmol), LiOH.H$_2$O (3.15 g, 75 mmol, 3.5 eq), water (2.70 g, 150 mmol 7 eq), methanol (7.5 mL) and MEK (150 mL) were combined. The flask was fitted with a reflux condenser and drying tube, and stirred while heating to reflux. After approximately 0.5 hr. the homogeneous reaction mixture began to deposit a white solid. After 24 hr the reaction mixture had deposited a large amount of white solid and appeared to be essentially heterogeneous. After 66 hrs the reaction mixture was then quenched into 1 N HCl (150 mL) and the heterogeneous quench mixture stirred for 1 hr. The white solid collected by vacuum filtration and then slurried with methanol, stirred for 2 hrs filtered and dried under to provide 16.56 g (80.7%) of the desired product.

EXAMPLE 5

Preparation of $[((c-C_6H_9)CH_2CH_2SiO_{1.5})_4((c-_6H_9)CH_2CH_2(OH)SiO_{1.0})_3]_{\Sigma7}$ In a 100-mL roundbottom flask containing a magnetic stir bar ($R^2$) [2-(3-cyclohexenyl) ethyl]triethoxysilane (10.0 g, 43.4 mmol), LiOH.OH$_2$O (0.83 g, 19.8 mmol, 3.2 eq), water (0.89 g, 49.6 mmol 8 eq), methanol (1 mL) and MEK (44 mL) were combined. The flask was fitted with a reflux condenser and drying tube and placed into an oil bath kept at 80° C. and stirred. The reaction mixture remained homogeneous.

After 14 hr the reaction mixture was quenched into a solution of water (150 mL) and phosphoric acid (2.02 mL, 1.5 eq relative to LiOH.H$_2$O). An oily phase separated and was stirred for 1 hr. Hexane/THF were added to the quench to give a homogeneous organic phase and the organic phase washed with successive portions of water and saturated brine. The organic phase was separated, dried over MgSO$_4$, filtered and then removed by rotary evaporation to provide a foamy solid which was dried by vacuum to provide 7.0 g (98%) of a mixture of the desired product $[((c-C_6H_9)CH_2CH_2SiO_{1.5})_4((c-C_6H_9)CH_2CH_2(OH)SiO_{1.0})_3]_{\Sigma7}$ and desired polymeric resin $[((c-C_6H_9)CH_2CH_2SiO_{1.5})_4((c-C_6H_9)CH_2CH_2(OH)SiO_{1.0})_3]_{\Sigma\infty}$ in a 70:30 ratio.

EXAMPLE 6

Preparation of $[((C_7H_9)SiO_{1.5})_4((C_7H_9)(OH)SiO_{1.0})_3]_{\Sigma7}$

In a 100-mL roundbottom flask containing a magnetic stir bar ($R^2$) Norbornenyltrimethoxysilane [5-(bicycloheptenyl) triethoxysilane] (10.0 g, 39 mmol), LiOH.H$_2$O (0.75 g, 17.8 mmol, 3.2 eq), water (0.80 g, 44.6 mmol 8 eq), methanol (1 mL) and MEK (39 mL) were combined. The flask was fitted with a reflux condenser and drying tube, placed into an oil bath kept at 80° C. and stirred. After approximately an hour the homogeneous reaction mixture began to deposit a white solid. After 14 hr the reaction mixture had deposited a large amount of white solid and appeared to be essentially heterogeneous.

The reaction mixture was then quenched into a solution of water (150 mL) and phosphoric acid (1.82 mL, 1.5 eq relative to LiOH.H$_2$O) and the heterogeneous quench mixture stirred for 1 hr. Hexane/THF were added to the quench to give a homogeneous organic phase and the organic phase washed with successive portions of water and saturated brine. The organic phase was separated, dried over MgSO$_4$, filtered and then the solvent removed by rotary evaporation to provide a white solid which was stirred with acetone and collected by vacuum filtration to provide 5.4 g (93%) of the desired product.

POSS Olefinic Silanol/Siloxide Derivatization Via Silation

The following examples are provided to demonstrate chemically derivatizing the silanol/siloxide functionality on the olefinic POSS systems.

EXAMPLE 7

Preparation of [(c-C$_5$H$_9$)SiO$_{1.5}$)$_6$((CH$_2$CH)SiO$_{1.5}$)$_1$(H$_2$N(CH$_2$)$_3$SiO$_{1.5}$)$_1$]$_{\Sigma 8}$ via chemical derivatization of [(c-C$_5$H$_9$)SiO$_{1.5}$)$_4$((CH$_2$CH)(OH)SiO$_1$)$_1$((c-C$_5$H$_9$)(OH)SiO$_1$)$_2$]$_{\Sigma 7}$

[(c-C$_5$H$_9$)SiO$_{1.5}$)$_4$((CH$_2$CH)(OH)SiO$_1$)$_1$((c-C$_5$H$_9$)(OH)SiO$_1$)$_2$]$_{\Sigma 7}$ (1 g) and ethanol (15 mL) were placed in a 100 mL round bottom flask and to it aminopropyltrimethoxysilane (0.521 g, 2.904×10$^{-3}$ mol) was added slowly with stirring. After reacting at room temperature for 24 h the white product was collected by filtration and washed with methanol to render 0.6 g (57%) of [(c-C$_5$H$_9$)SiO$_{1.5}$)$_6$((CH$_2$CH)SiO$_{1.5}$)$_1$(H$_2$N(CH$_2$)$_3$SiO$_{1.5}$)$_1$]$_{\Sigma 8}$. The product was characterized by multinuclear NMR.

EXAMPLE 8

Preparation of [((C$_7$H$_9$)SiO$_{1.5}$)$_7$(CH$_2$=CCH$_3$C(O)OCH$_2$CH$_2$CH$_2$)SiO$_{1.0}$)$_1$]$_{\Sigma 8}$ from [((C$_7$H$_9$)SiO$_{1.5}$)$_4$((C$_7$H$_9$)(OH)SiO$_{1.0}$)$_3$]$_{\Sigma 7}$ A solution of 3-methacryloxypropyltrichlorosilane (0.5 g, 0.4 mL, 1.9 mmol, 1.01 eq) in THF (1.5 mL) was added dropwise to a solution of trisilanolnorbornene POSS ([((C$_7$H$_9$)SiO$_{1.5}$)$_4$((C$_7$H$_9$)(OH)SiO$_{1.0}$)$_3$]$_{\Sigma 7}$) (2.0 g, 1.9 mmol) and dry triethylamine (0.63 g, 0.87 mL, 6.2 mmol, 3.25 eq) in anhydrous THF (10 mL). A precipitate of Et$_3$N.HCl formed upon addition of the chlorosilane. After the addition was complete, the reaction mixture was stirred for 14 hr. The reaction was transferred to a separatory funnel and diethylether (10 mL) added. The organic layer was washed with 1N acetic acid, water and saturated brine. The organic phase was dried over MgSO$_4$, filtered and the solvent removed by rotary evaporation. The resulting white solid was washed with MeOH collected by vacuum filtration and dried to provide 1.5 g (65%) of the product as a white solid.

EXAMPLE 9

Preparation of [((c-C$_6$H$_9$)SiO$_{1.5}$)$_7$((CH$_2$=CCH$_3$C(O)O(CH$_2$)$_3$SiO$_{1.5}$)$_1$]$_{\Sigma 8}$ from ([((c-C$_6$H$_9$)SiO$_{1.5}$)$_4$((C$_6$H$_9$)(OH)SiO$_{1.0}$)$_3$]$_{\Sigma 7}$ Dry triethylamine (1.77 g, 2.44 mL, 17.5 mmol, 3.5 eq) was added dropwise to a cold (0° C. solution of trisilanolcyclohexene ([((c-C$_6$H$_9$)SiO$_{1.5}$)$_4$((c-C$_6$H$_9$)(OH)SiO$_{1.0}$)$_3$]$_{\Sigma 7}$) (4.79 g, 5.0 mmol) and 3-methacryloxypropyltrichlorosilane (1.44 g, 1.15 mL, 5.5 mmol, 1.1 eq) in anhydrous THF (25 mL). A precipitate of Et$_3$N.HCl formed upon addition of the Et$_3$N. After the addition was complete, the reaction mixture was warmed to room temperature and allowed to stir for 16 hr. The reaction was quenched with 1N HCl (10 mL) and hexane (10 mL) added. The mixture was stirred well and the organic phase separated and washed once with saturated brine. The solvent was removed by rotary evaporation to give a solid paste, which upon stirring with acetone (50 mL) and methanol (50 mL) gave a white solid which was collected by vacuum filtration, washed with methanol and dried to provide 4.01 g (72%) of the product as a white solid.

EXAMPLE 10

Preparation of [(C$_4$H$_9$SiO$_{1.5}$)$_4$(C$_3$H$_5$SiO$_{1.5}$)$_3$((H$_3$C)$_2$HCOTiO$_{1.5}$)$_1$]$_{\Sigma 8}$)

Ti(OCH(CH$_3$)$_2$)$_4$ (1.0 g, 3.5 mmol) was added under argon to a solution of [(C$_4$H$_9$SiO$_{1.5}$)$_4$(C$_3$H$_5$HOSiO$_1$)$_3$]$_{\Sigma 7}$ (2.25 g, ≈3.0 mmol) dissolved in hexane (20 mL) and the reaction was left stirring for 2 h at 50° C. Evaporation of solvents in vacuo gave the product as a slightly sticky white solid (2.58 g, 2.8 mmol). Characterization was carried out by multinuclear NMR spectroscopy. $^1$H NMR (400 MHz, CDCl$_3$, 25° C.) δ 5.79 (m, 2 H, —CH=), 4.93 (m, 4 H, =CH$_2$), 4.20 (br s, 1 H, OCH(CH$_3$)$_2$), 1.87 (m, 5 H, —CH—), 1.61 (m, 4 H, —CH$_2$—CH=CH$_2$), 1.23 (m, 6 H, OCH(CH$_3$)$_2$), 0.96 (m, 30 H,CH$_3$), 0.60 (m, 10 H, CH$_2$).

EXAMPLE 11

Preparation of MCM-[(C$_4$H$_9$SiO$_{1.5}$)$_4$(C$_3$H$_5$SiO$_{1.6}$)$_3$((H$_3$C)$_2$HCOTIO$_{1.5}$)$_1$]$_{\Sigma 8}$) Materials for Catalysis Application MCM zeolite type catalyst materials were prepared under the same conditions with variation of the [(C$_4$H$_9$SiO$_{1.5}$)$_4$(C$_3$H$_5$SiO$_{1.5}$)$_3$((H$_3$C)$_2$HCOTiO$_{1.5}$)$_1$]$_{\Sigma 8}$/tetraethylorthosilicate (TEOS) molar ratio. Water 6.0 g (0.33 mol) was mixed with 4.77 g NH$_4$OH (30 wt.-% NH$_3$; 0.07 mol NH$_3$) and stirred for 1 min. To this solution was added 0.33 g cetyltrimethylammonium bromide CTABr (0.91 mol) and the solution was stirred for 0.5 h at room temperature. A mixture of [(C$_4$H$_9$SiO$_{1.5}$)$_4$(C$_3$H$_5$SiO$_{1.5}$)$_3$((H$_3$C)$_2$HCOTiO$_{1.5}$)$_1$]$_{\Sigma 8}$ and TEOS were added in various ratios from 10-80 mole % POMS in order to alter the amount of Ti incorporated into the catalyst from 0.3-2.7 wt %. For example, [(C$_4$H$_9$SiO$_{1.5}$)$_4$(C$_3$H$_5$SiO$_{1.5}$)$_3$((H$_3$C)$_2$HCOTiO$_{1.5}$)$_1$]$_{\Sigma 8}$ was added at a high loading of 80/20 POSS:TEOS mol % ratio, and low loading of 13/87 POSS:TEOS. The solution was stirred for 0.5 h at room temperature during which time a white precipitate slowly formed. The precipitate was aged in its supernatant at 80° C. for 4 days. The product was filtered, washed with water and dried in air at 80° C. A final washing for 6 h at 50° C. was carried out using a 5 g HCl (37 wt.-%)/150 g MeOH mixture followed by filtration, washing with MeOH and drying in air overnight at 80° C. The desired product was isolated in high yield as a white solid. Characterization was carried out by SEM, ICP, EDAX and BET analysis. The incorporation of Ti POMS into MCM was found to retain the original texture and structure of the initial MCM while favorably improving the mechanical and physical stability of the material.

| Mol % TEOS:[($C_4H_9SiO_{1.5}$)$_4$($C_3H_5SiO_{1.5}$)$_3$(($H_3C$)$_2$HCOTi$O_{1.5}$)1]$_{\Sigma 8}$ | Wt % Ti by ICP analysis | Surface area $m^2/g$ | Pore volume $cm^3/g$ | Average pore diam. |
|---|---|---|---|---|
| 100:0 | 0 | 870.49 | 0.940 | 3.15 nm |
| 87:13 | 0.39 | 335.45 | 0.329 | 3.15 nm |
| 80:20 | 0.73 | 200.99 | 0.178 | 2.90 nm |
| 50:50 | 2.68 | 19.51 | 0.018 | 3.32 nm |

POSS Oleilnic Silanol/Siloxide Derivatization Via Oxidation of $R^2$

The following examples are provided to demonstrate the ability to carryout chemical derivatization of the $R^2$ groups on the functionalized POSS cages.

EXAMPLE 12

Epoxidation of [(($C_6H_9$)$SiO_{1.5}$)$_4$(($C_6H_9$)(OH)$SiO_{1.0}$)$_3$]$_{\Sigma 7}$ A 50 g sample of [(($C_6H_9$)$SiO_{1.5}$)$_4$(($C_6H_9$)(OH)$SiO_{1.0}$)$_3$]$_{\Sigma 7}$ was stirred into peracetic acid (200 ml) chloroform (500 ml), sodium bicarbonate (62.1 g) and sodium acetate (1.1 g) mixture and refluxed. After 2 hours the reaction was stopped by cooling. At room temperature water (700 ml) was added and the mixture stirred and filtered and was allowed to phase separate into an aqueous layer and organic layer. The organic layer was separated and treated with methanol (100 ml) to yield a white solid of epoxidized product. Note that MCPBA (metachloroperbenzoic acid) is also an acceptable oxidizing agent in place of the peracetic acid.

EXAMPLE 13

Epoxidation of [(($CC_6H_9$)$SiO_{1.5}$)$_7$(($CH_2$=$CCH_3$C(O)O($CH_2$)$_3$$SiO_{1.5}$)$_1$]$_{\Sigma 8}$ A solution of 35% peracetic acid (1.5 g, 7.0 mmol) in $CHCl_3$ (5 mL) was added dropwise to a refluxing mixture of methacrylcyclohexene POSS ([((c-$C_6H_9$)$SiO_{1.5}$)$_7$(($CH_2$=$CCH_3$C(O)O$CH_2CH_2CH_2$)$SiO_{1.5}$)$_1$]$_{\Sigma 8}$ (2.2 g, 2.0 mmol), sodium bicarbonate (1.4 g), and sodium acetate (50 mg, 0.6 mmol) in chloroform (25 mL). After 40 min the progress of the reaction was checked by HPLC and found to be 75% complete. Additional peracetic acid (1.5 g, 7.0 mmol) and sodium bicarbonate (1.4 g) were added and the reaction progress checked 25 min after the second addition and found to be complete. The reaction mixture was cooled to room temperature and water (100 ml) was added. After through stirring the organic phase was allowed to separate and the lower $CHCl_3$ layer isolated, filtered through a Celite® pad and concentrated to give a syrup. Addition of methanol (80 mL) and stirring provided a white solid which was collected by vacuum filtration and dried to provide 1.05 g (43%) of the epoxidized product. Note that MCPBA (metachloroperbenzoic acid) is also an acceptable oxidizing agent in place of the peracetic acid.

EXAMPLE 14

Preparation of [(($OC_6H_9$)$SiO_{1.5}$)$_7$(($CH_2$=$CCH_3$C(O)O($CH_2$)$_3$$SiO_{1.5}$)$_1$]$_{\Sigma 8}$ from [(($C_6H_9$)$SiO_{1.5}$)$_7$(($CH_2$=$CCH_3$C(O)O($CH_2$)$_3$$SiO_{1.5}$)$_1$]$_{\Sigma 8}$ A 50 g sample of [(($C_6H_9$)$SiO_{1.5}$)$_7$(($CH_2$=$CCH_3$C(O)O($CH_2$)$_3$$SiO_{1.5}$)$_1$]$_{\Sigma 8}$ was stirred into peracetic acid (200 ml) chloroform (500 ml), sodium bicarbonate (62.1 g) and sodium acetate (1.1 g) mixture and refluxed. After 2 hours the reaction was stopped by cooling. At room temperature water (700 ml) was added and the mixture stirred and filtered and was allowed to phase separate into, an aqueous layer and organic layer. The organic layer was separated and treated with methanol (100 ml) to yield a white solid of epoxidized product. Note that MCPBA (metachloroperbenzoic acid) is also an acceptable oxidizing agent in place of the peracetic acid.

EXAMPLE 15

Preparation of [(((OH)$_2$$C_6H_9$)$SiO_{1.5}$)$_7$($CH_2$=$CCH_3$C(O)O($CH_2$)$_3$$SiO_{1.5}$)$_1$]$_{\Sigma 8}$ from [(($OC_6H_9$)$SiO_{1.5}$)$_7$(($CH_2$=$CCH_3$C(O)O($CH_2$)$_3$$SiO_{1.5}$)$_1$]$_{\Sigma 8}$ Concentrated $HClO_4$ (0.1 mL, 1.2 mmol) was added dropwise to a solution of methacrylepoxycyclohexane POSS ([(($OC_6H_9$)$SiO_{1.5}$)$_7$(($CH_2$=$CCH_3$C(O)O$CH_2CH_2CH_2$)$SiO_{1.5}$)$_1$]$_{\Sigma 8}$) (9.80 g, 8.01 mmol) and water (5.00 g, 277 mmol) in THF (100 mL) at room temperature. After stirring 18 h, the solvent was removed under vacuum and the residue dissolved in 3:2 (vol:vol) methanol:ethyl acetate (30 mL). This solution was precipitated into MTBE (330 mL) at room temperature. The white solid that precipitated was collected by vacuum filtration and dried under vacuum at 35° C. overnight. The final product is insoluble in hydrocarbon solvents and has very limited solubility in ethyl acetate, THF, and acetonitrile yet is highly soluble in methanol and DMSO.

POSS Olefinic Derivatization of $R^2$

The following examples are provided to demonstrate the ability to carry out chemical derivatization of the $R^2$ groups on functionalized POSS cages. The procedures are in no way limiting yet provide examples of how chemical derivatization of the R groups can be utilized to change solubility and physical properties of POSS as well as function.

EXAMPLE 16

Hydrosilylation of [($C_4H_9SiO_{1.5}$)$_4$($C_3H_5SiO_{1.5}$)$_3$(($H_3C$)$_2$HCOTi$O_{1.5}$)$_1$]$_{\Sigma 8}$

[($C_4H_9SiO_{1.5}$)$_4$($C_3H_5SiO_{1.5}$)$_3$(($H_3C$)$_2$HCOTi$O_{1.5}$)$_1$]$_{\Sigma 8}$ (2.3 g, 2.5 mmol) was dissolved in argon purged toluene (6 mL) and ($CH_3CH_2O$)$_3$SiH (600 µL, 3.2 mmol) was added followed by 20 mg of platinum-divinyltetramethyldisiloxane complex in xylene. The reaction was stirred for 30 minutes at room temperature followed by heating to 60° C. for 8 hours. Volatiles were removed under reduced pressure to render [($C_4H_9SiO_{1.5}$)$_4$(($CH_3CH_2O$)$_3$Si$C_3H_6SiO_{1.5}$)$_3$(($H_3C$)$_2$HCOTi$O_{1.5}$)$_1$]$_{\Sigma 8}$ as a yellow solid (2.1 g). The product was characterized by multinuclear NMR spectroscopy $^1$H NMR (400 MHz, $CDCl_3$, 25° C.) δ 5.75 (m, 2 H, —CH=), 4.90 (m, 4 H, =CH$_2$), 4.40 (br s, 1 H, OCH(CH$_3$)$_2$), 3.82 (m, 6 H, —Si (OCH$_2$CH$_3$)$_3$), 1.84 (m, 5 H, —CH—), 1.58 (m, 4 H, —CH$_4$—CH=CH$_2$), 1.41-1.21 (m, 15 H, CH$_2$, —Si (OCH$_2$CH$_3$)$_3$, OCH(CH$_3$)$_2$), 0.95 (m, 30 H, CH$_3$), 0.59 (m, 10 H, CH$_2$).

EXAMPLE 17

General Procedure for Hydroformylation of Olefinic POSS

A solution of PtCl$_2$(Sixantphos), (0.016 g, 0.019 mmol) and SnCl$_2$ (0.0036 g, 0.019 mmol) in CH$_2$Cl$_2$ (5 mL) was stirred for 1 hour, than transferred into a stainless steel autoclave (100 mL internal volume). Additional CH$_2$Cl$_2$ (15 mL) was added, followed by heating of the autoclave to 60° C. and subsequent inlet of synthesis gas (CO/H$_2$ ratio 1:1) to 40 bar. The autoclave was allowed to equilibrate for one hour, than a solution of silsesquioxane in CH$_2$Cl$_2$ (total volume, 10 mL) was added, and the reaction was run at 60° C./40 bar for 17 hours. The autoclave was cooled in ice and depressurized, after which the reaction mixture was evaporated to dryness. Pentane (20 mL) was added, and the catalyst was filtered off. Evaporation of the filtrate gave the hydroformylated POSS product. The products were characterized by multinuclear NMR spectroscopy. Other hydroformylation catalysts such as [Rh(Acac)/(CO)$_2$]/Xantphos can also be utilized.

| POSS Formula | mmol used | Aldehyde selectivity | Linear:Branched ratio | Remarks |
|---|---|---|---|---|
| [(C$_4$H$_9$SiO$_{1.5}$)$_5$(C$_3$H$_5$SiO$_{1.5}$)$_3$]$_{\Sigma 8}$ | 3.0 | 100% | 15:1 | Well defined |
| [(C$_4$H$_9$SiO$_{1.5}$)$_5$(C$_2$H$_3$SiO$_{1.5}$)$_3$]$_{\Sigma 8}$ | 3.0 | 100% | >15:1 | Well defined |
| ([(C$_4$H$_9$)SiO$_{1.5}$)$_4$((C$_4$H$_9$)(OSi(CH$_3$)$_2$CHCH$_2$)SiO$_1$)$_3$]$_{\Sigma 10}$ | 3.4 | 100% | Linear only | Well defined |

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method for derivatizing olefinic functionalized polyhedral oligomeric silsesquioxane (POSS) or polyhedral oligomeric silicate (POS) silanol or siloxide molecules comprising the steps of:
   (a) reacting a silane coupling agent of the formula R$^2$SiX$_3$ in the presence of a hydroxide base to form POSS or POS silanol or siloxide molecules, wherein the R$^2$ group contains an olefin group and X is selected from the group consisting of OH, ONa, OLi, OK, OCs, Cl, Br, I, alkoxide (OR), formate (OCH), acetate (OCOR), acid (OCOH), ester (OCOR), peroxide (OOR), amine (NR$_2$), isocyanate (NCO), and R$^3$, where R and R$^3$ are the same or different and each represents an organic substituent group selected from the group consisting of H, siloxy, and aliphatic and aromatic groups that may contain additional reactive functionalities;
   (b) reacting a silane coupling agent of the formula R$^1$SiX$_3$ with the POSS or POS silanol or siloxide molecules in the presence of a hydroxide base, wherein the R$^1$ group contains an alkyl or aromatic group, and wherein said POSS or POS silanol or siloxide molecules contain both R$^1$ and R$^2$; and
   (c) chemical derivatization of R$^2$, wherein the derivatization is selected from the group consisting of oxidation, addition, and metathesis reactions, while preserving the R$^1$ and silanol or siloxide functionality.

2. The method of claim 1, further comprising the step of modification of the POSS or POS silanol or siloxide groups by a reaction selected from the group consisting of silation, reaction with a metal, or reaction with a surface.

3. The method of claim 2, wherein the metallized molecule from reaction with a metal serves as a heterogeneous catalyst or coreagent.

4. The method of claim 1, wherein R$^2$ is converted to a biologically compatible group selected from the group consisting of amino acids, sugars, and therapeutics.

5. A method for modifying olefinic functionalized polyhedral oligomeric silsesquioxane (POSS) or polyhedral oligomeric silicate (POS) silanol or siloxide molecules comprising the steps of:
   (a) reacting a silane coupling agent of the formula R$^2$SiX$_3$ in the presence of a hydroxide base to form POSS or POS silanol or siloxide molecules, wherein the R$^2$ group contains an olefin group and X is selected from the group consisting of OH, ONa, OLi, OK, OCs, Cl, Br, I, alkoxide (OR), formate (OCH), acetate (OCOR), acid (OCOH), ester (OCOR), peroxide (OOR), amine (NR$_2$), isocyanate (NCO), and R$^3$, where R and R$^3$ are the same or different and each represents an organic substituent group selected from the group consisting of H, siloxy, and aliphatic and aromatic groups that may contain additional reactive functionalities; and
   (b) modification of the POSS or POS silanol or siloxide groups by a reaction selected from the group consisting of silation, reaction with a metal, or reaction with a surface.

6. The method of claim 5, wherein the metallized molecule from reaction with a metal serves as a heterogeneous catalyst or coreagent.

7. A method for modifying olefinic functionalized polyhedral oligomeric silsesquioxane (POSS) or polyhedral oligomeric silicate (POS) silanol or siloxide molecules comprising the steps of:
   (a) reacting a silane coupling agent of the formula R$^2$SiX$_3$ in the presence of a hydroxide base to form POSS or POS silanol or siloxide molecules, wherein the R$^2$ group contains an olefin group and X is selected from the group consisting of OH, ONa, OLi, OK, OCs, Cl, Br, I, alkoxide (OR), formate (OCH), acetate (OCOR), acid (OCOH), ester (OCOR), peroxide (OOR), amine (NR$_2$), isocyanate (NCO), and R$^3$, where R and R$^3$ are the same or different and each represents an organic substituent group selected from the group consisting of H, siloxy, and aliphatic and aromatic groups that may contain additional reactive functionalities;

(b) reacting a silane coupling agent of the formula $R^1SiX_3$ in the presence of a hydroxide base to form POSS or POS silanol or siloxide molecules, wherein the $R^1$ group contains an alkyl or aromatic group, and wherein said POSS or POS silanol or siloxide molecules contain both $R^1$ and $R^2$; and (c) modification of the POSS or POS silanol or siloxide groups by a reaction selected from the group consisting of silation, reaction with a metal, or reaction with a surface.

8. The method of claim 7, wherein the metallized molecule from reaction with a metal serves as a heterogeneous catalyst or coreagent.

9. A method for preparing olefinic functionalized polyhedral oligomeric silsesquioxane (POSS) or polyhedral oligomeric silicate (POS) silanol or siloxide molecules comprising reacting a plurality of silane coupling agents of the formula $R^2SiX_3$ in the presence of a hydroxide base to form POSS or POS silanol or siloxide molecules, wherein a plurality of $R^2$ groups each containing an olefin group, are reacted to prepare POSS or POS silanol or siloxide molecules functionalized with different olefins, and X is selected from the group consisting of OH, ONa, OLi, OK, OCs, Cl, Br, I, alkoxide (OR), formate (OCH), acetate (OCOR), acid (OCOH), ester (OCOR), peroxide (OOR), amine ($NR_2$), isocyanate (NCO), and $R^3$, where R and $R^3$ are the same or different and each represents an organic substituent group selected from the group consisting of H, siloxy, and aliphatic and aromatic groups that may contain additional reactive functionalities.

10. The method of claim 9, wherein a continuous process renders the silanol or siloxide molecules.

* * * * *